US012613461B2

(12) United States Patent
Lin et al.

(10) Patent No.: US 12,613,461 B2
(45) Date of Patent: Apr. 28, 2026

(54) WAVELENGTH CONVERSION COMPONENT AND LIGHT SOURCE MODULE

(71) Applicant: DELTA ELECTRONICS, INC., Taoyuan City (TW)

(72) Inventors: Hung-Ying Lin, Taoyuan City (TW); Yen-I Chou, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 378 days.

(21) Appl. No.: 18/349,168

(22) Filed: Jul. 9, 2023

(65) Prior Publication Data

US 2024/0302728 A1 Sep. 12, 2024

(30) Foreign Application Priority Data

Mar. 8, 2023 (CN) .......................... 202310215924.2

(51) Int. Cl.
*G03B 21/20* (2006.01)

(52) U.S. Cl.
CPC ....... *G03B 21/2066* (2013.01); *G03B 21/204* (2013.01)

(58) Field of Classification Search
CPC ........ H04N 9/31; H04N 9/312; H04N 9/3114; H04N 9/3117; H04N 9/3141; H04N 9/3152; H04N 9/3161; H04N 9/3164; G03B 21/14; G03B 21/28; G03B 21/145; G03B 21/204; G03B 21/2013; G03B 21/2033; G03B 21/2053; G03B 21/2066
See application file for complete search history.

(56) References Cited

U.S. PATENT DOCUMENTS

| | | | |
|---|---|---|---|
| 2012/0201030 A1* | 8/2012 | Yuan | H04N 9/3161 362/293 |
| 2016/0061391 A1* | 3/2016 | Inoue | H10H 20/8514 362/84 |
| 2016/0377966 A1* | 12/2016 | Hsu | G03B 33/08 362/84 |
| 2019/0361221 A1* | 11/2019 | Hsieh | H04N 9/3161 |
| 2021/0096357 A1* | 4/2021 | Li | G03B 21/16 |
| 2021/0108767 A1* | 4/2021 | Li | H04N 9/3158 |

(Continued)

FOREIGN PATENT DOCUMENTS

| | | |
|---|---|---|
| CN | 104969370 A | 10/2015 |
| TW | 201351713 A | 12/2013 |

(Continued)

*Primary Examiner* — Sultan Chowdhury
(74) *Attorney, Agent, or Firm* — CKC & Partners Co., LLC

(57) ABSTRACT

A wavelength conversion component includes a substrate, a reflection layer, and a phosphor layer. The reflection layer is disposed on the substrate and extends along a first direction. The reflection layer has a top surface that is away from the substrate. The top surface has a height variation on a second direction that is perpendicular to the first direction along the first direction. The phosphor layer is disposed on the reflection layer. The phosphor layer has a thickness variation on the second direction along the first direction. A ratio of the height of the top surface and the thickness of the phosphor layer increases and decreases reciprocally along the first direction.

14 Claims, 13 Drawing Sheets
(2 of 13 Drawing Sheet(s) Filed in Color)

(56) References Cited

U.S. PATENT DOCUMENTS

| | | | | |
|---|---|---|---|---|
| 2021/0286244 A1* | 9/2021 | Lin | ........................ | G03B 33/08 |
| 2021/0344883 A1* | 11/2021 | Aketa | .................. | H04N 9/3158 |

FOREIGN PATENT DOCUMENTS

| | | | |
|---|---|---|---|
| TW | 201731129 A | 9/2017 | |
| TW | M568397 U | 10/2018 | |
| WO | 2014123145 A1 | 8/2014 | |

* cited by examiner

WAVELENGTH CONVERSION COMPONENT AND LIGHT SOURCE MODULE

CROSS-REFERENCE TO RELATED APPLICATION

This application claims priority to China Application Serial Number 202310215924.2, filed Mar. 8, 2023, which is herein incorporated by reference.

BACKGROUND

Technical Field

The present disclosure relates to a wavelength conversion component and a light source module.

Description of Related Art

Compared with an ordinary light source, a laser light source have a longer lifespan and a more saturated color rendering. Therefore, a laser light projector can provide better viewing experience with lower maintenance cost. The laser light projector generates visible light of other wavelengths by exciting phosphors on a wavelength conversion component such as color wheels with light containing specific wavelengths (e.g., blue light). Therefore, the energy conversion efficiency of the wavelength conversion component is very important to the performance of the projector. However, the energy conversion efficiency of the general wavelength conversion component is often poor due to light scattering in the wavelength conversion component.

Accordingly, how to provide wavelength conversion component and a light source module that can solve the aforementioned problems becomes an important issue to be solved by those in the industry.

SUMMARY

An aspect of the disclosure is to provide a wavelength conversion component and a light source module.

According to an embodiment of the disclosure, a wavelength conversion component includes a substrate, a reflection layer, and a phosphor layer. The reflection layer is disposed on the substrate and extends along a first direction. The reflection layer has a top surface away from the substrate. The top surface has a height variation in a second direction perpendicular to the first direction along the first direction. The phosphor layer is disposed on the reflection layer. The phosphor layer has a thickness variation in the second direction along the first direction. A ratio of a height of the top surface and a thickness of the phosphor layer increases and decreases reciprocally along the first direction.

In one or more embodiments of the present disclosure, the reflection layer has a uniform thickness and is conformally formed on the substrate.

In one or more embodiments of the present disclosure, the reflection layer has a thickness variation in the second direction along the first direction.

In one or more embodiments of the present disclosure, the ratio varies continuously along the first direction.

In one or more embodiments of the present disclosure, the ratio varies discontinuously along the first direction.

In one or more embodiments of the present disclosure, the phosphor layer exposes at least a part of the top surface of the reflection layer.

In one or more embodiments of the present disclosure, a maximum thickness of the phosphor layer is in a range from 50μ m to 200μ m.

In one or more embodiments of the present disclosure, the reflection layer further includes a plurality of reflection units. Each of the reflection units has a recessed structure.

In one or more embodiments of the present disclosure, at least one of the reflection units is formed by a plurality of planes that are spliced.

In one or more embodiments of the present disclosure, an angle between a sidewall of at least one of the reflection units and the second direction is greater than 45 degrees.

In one or more embodiments of the present disclosure, at least one of the reflection units has a bottom surface extending along the first direction.

In one or more embodiments of the present disclosure, at least one of the reflection units includes at least one curved surface.

According to an embodiment of the disclosure, a light source module includes a wavelength conversion component and a light source. The wavelength conversion component includes a substrate, a reflection layer, and a phosphor layer. The reflection layer is disposed on the substrate and extends along a first direction. The reflection layer has a top surface away from the substrate. The top surface has a height variation in a second direction perpendicular to the first direction along the first direction. The phosphor layer is disposed on the reflection layer. The phosphor layer has a thickness variation in the second direction along the first direction. A ratio of a height of the top surface and a thickness of the phosphor layer increases and decreases reciprocally along the first direction. The light source is configured to emit light to the wavelength conversion component. The light forms a light spot on the phosphor layer.

In one or more embodiments of the present disclosure, the reflection layer of the wavelength conversion component further includes a plurality of reflection units. A ratio of a width of at least one of the reflection units to a width of the light spot is in a range from 1/2 to 1/20.

In one or more embodiments of the present disclosure, at least one of the reflection units has a width in a range from 0.4 mm to 1.2 mm.

In one or more embodiments of the present disclosure, a width of the light spot is in a range from 1 mm to 4 mm.

In one or more embodiments of the present disclosure, the reflection layer of the wavelength conversion component further includes a plurality of reflection units. In a first direction, a number of the reflection units covered by the light spot is in a range from 3 to 4.

In one or more embodiments of the present disclosure, the reflection layer of the wavelength conversion component further includes a plurality of reflection units. A number of reflection units covered by the light spot is in a range from 5 to 20.

Accordingly, in the wavelength conversion component and the light source module of some embodiments of the present disclosure, disposing the phosphor layer on the reflection layer with a height variation can effectively limit the exit direction of the excited light generated by the phosphor layer. When the exit direction of the excited light is restricted, the lateral scattering of the excited light on the wavelength conversion component will be reduced, and the etendue of the wavelength conversion component will also be reduced accordingly. The excited light generated by the phosphor layer is confined and exits in a direction perpendicular to the wavelength conversion component, which can improve the energy conversion efficiency of the wavelength conversion component. The light source module with the aforementioned wavelength conversion component will be able to improve its light utilization efficiency.

It is to be understood that both the foregoing general description and the following detailed description are by examples, and are intended to provide further explanation of the disclosure as claimed.

BRIEF DESCRIPTION OF THE DRAWINGS

The patent or application file contains at least one drawing executed in color. Copies of this patent or patent application publication with color drawing(s) will be provided by Office upon request and payment of the necessary fee. The disclosure can be more fully understood by reading the following detailed description of the embodiment, with reference made to the accompanying drawings as follows.

DETAILED DESCRIPTION

Figure 1A:
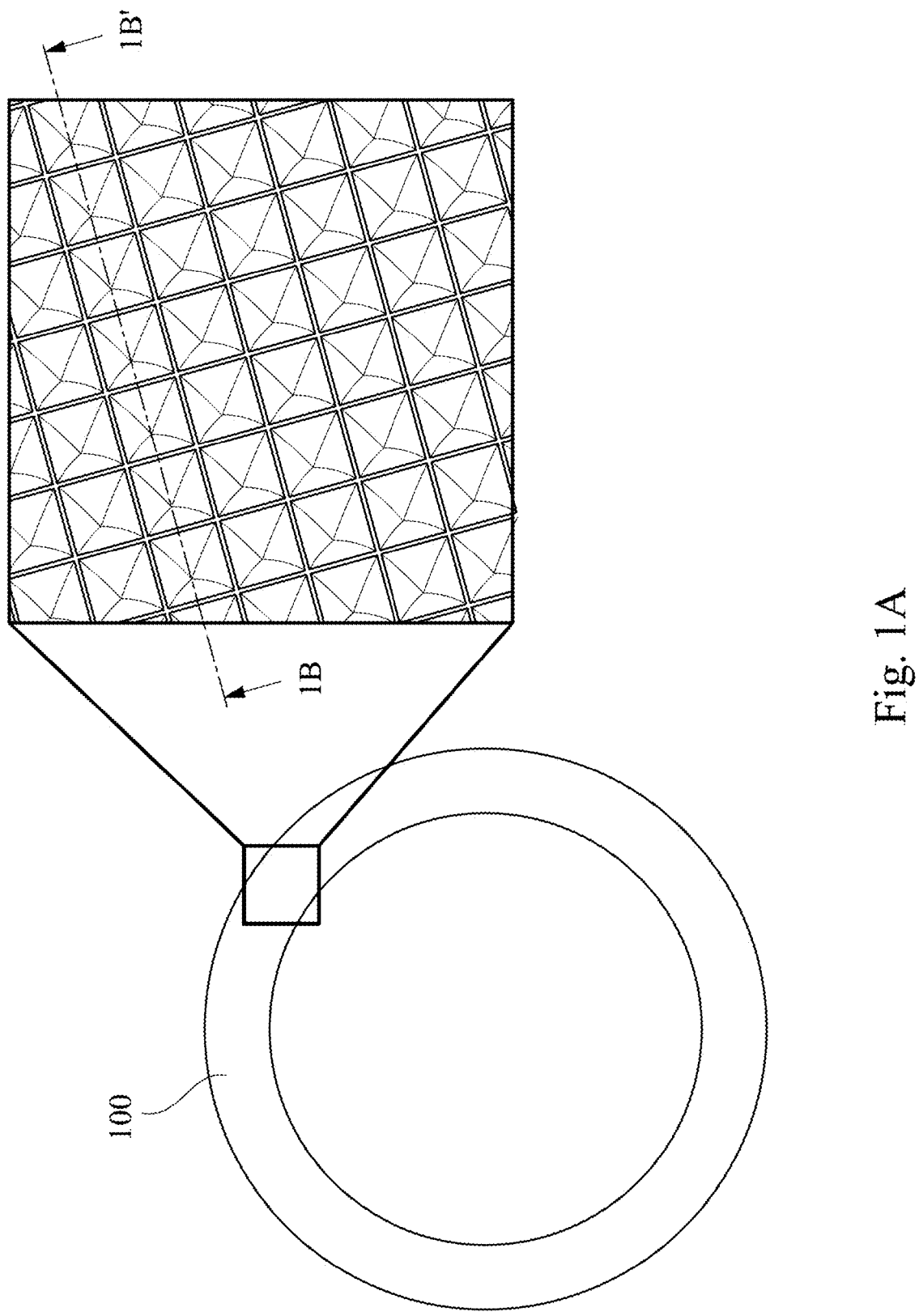
FIG. 1A is a schematic diagram and a partially enlarged view of a wavelength conversion component according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1B:
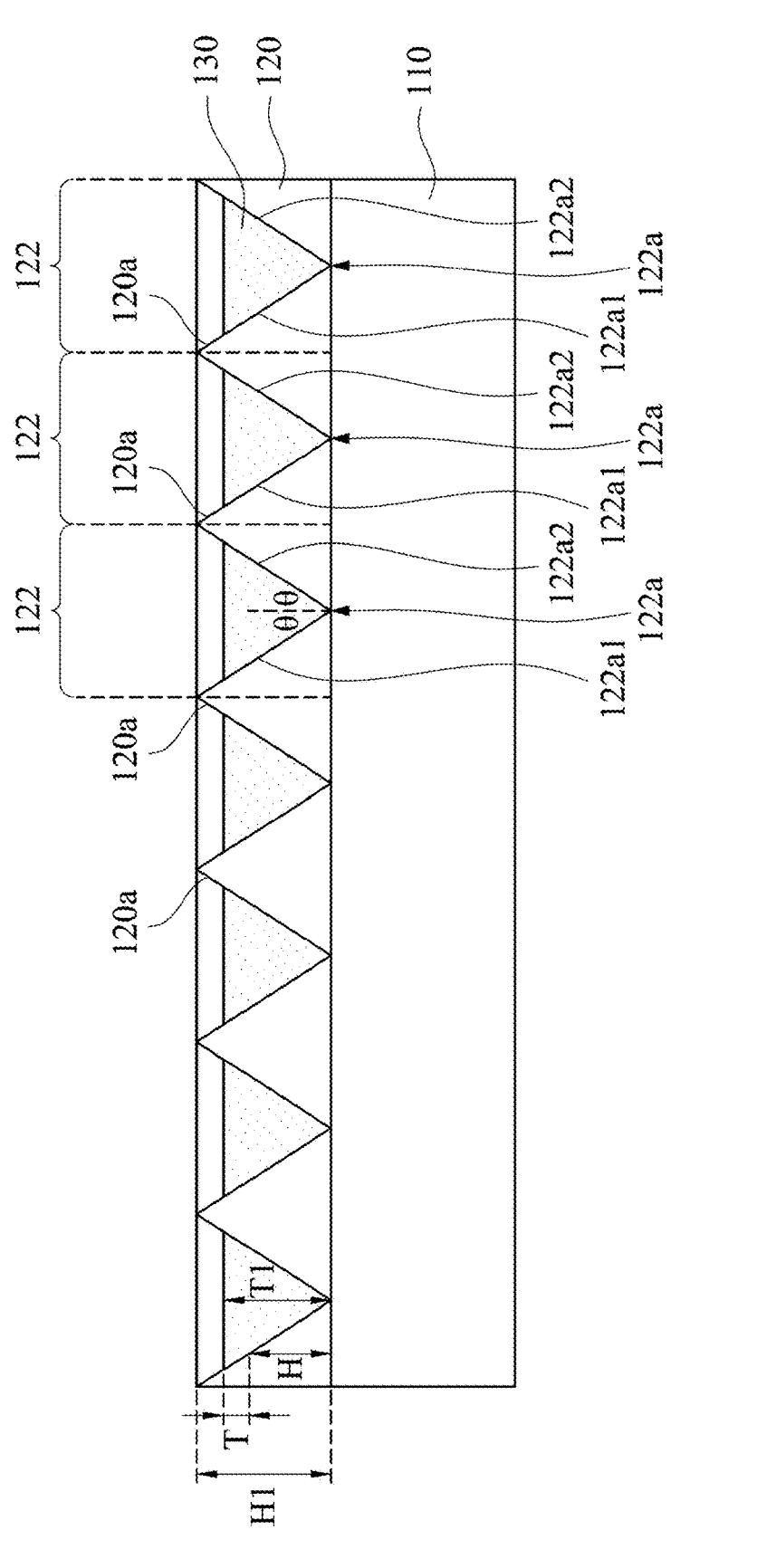
FIG. 1B is a partially enlarged cross-sectional side view of the wavelength conversion component taken along a cross-section indicating line 1B-1B' in FIG. 1A according to an embodiment of the present disclosure.

Reference is made to FIGS. 1A and 1B. FIG. 1A is a schematic diagram and a partially enlarged view of a wavelength conversion component 100 according to some embodiments of the present disclosure. FIG. 1B is a partially enlarged cross-sectional side view of the wavelength conversion component 100 taken along a cross-section indicating line 1B-1B' in FIG. 1A according to an embodiment of the present disclosure. Some embodiments of the present disclosure are related to a wavelength conversion component 100 which includes a substrate 110, a reflection layer 120, and a phosphor layer 130. The reflection layer 120 is disposed on the substrate 110 and extends along a first direction A1. The reflection layer 120 has a top surface 120$a$ away from the substrate 110. The top surface 120$a$ has a height variation in a second direction A2 perpendicular to the first direction A1 along the first direction A1. The phosphor layer 130 is disposed on the reflection layer 120. The phosphor layer 130 has a thickness variation in the second direction A2 along the first direction A1. A ratio of a height H1 of the top surface 120$a$ and a thickness T1 of the phosphor layer 130 increases and decreases reciprocally along the first direction A1. By disposing the phosphor layer 130 on the reflection layer 120 with the height variation, the exit direction of the excited light generated by the phosphor layer 130 can be effectively limited. When the exit direction of the excited light is restricted, the lateral scattering of the excited light on the wavelength conversion component 100 will be reduced, and the etendue of the wavelength conversion component 100 will also be reduced accordingly. The excited light generated by the phosphor layer 130 is confined and exits in a direction perpendicular to the wavelength conversion component 100, which can improve the energy conversion efficiency of the wavelength conversion component 100, and a light source module (e.g., a light source module 400 in FIG. 4) with the aforementioned wavelength conversion component 100 will be able to improve its light utilization efficiency.

As shown in FIGS. 1A and 1B, in some embodiments, the wavelength conversion component 100 may be a color wheel in a projection device. However, the wavelength conversion component 100 can also be used in other devices that need to perform wavelength conversion. In the embodiment of FIG. 1B, the reflection layer 120 has a thickness variation in the second direction A2 along the first direction A1. Specifically, the height H1 of the reflection layer 120 in the second direction A2 corresponds to the maximum value of the thickness T of the reflection layer 120. In other words, the height variation of the reflection layer 120 in the second direction A2 comes from the thickness variation of the reflection layer 120 in the second direction A2. In some embodiments, the reflection layer 120 with the thickness variation can be formed by first forming a material layer on the substrate 110 and then patterning the material layer. The patterning the material layer may include embossing the material layer with a mold. However, other suitable patterning processes or etching processes may also be used to form the reflection layer 120 with the thickness variation. The material of the reflection layer 120 may contain metal, such as aluminum.

As shown in FIGS. 1A and 1B, in some embodiments, the reflection layer 120 includes a plurality of reflection units 122. Each of the reflection units 122 has a recessed structure 122a. In addition, in some embodiments, at least one of the reflection units 122 is formed by a plurality of planes (e.g., sidewalls 122a1, 122a2) that are spliced. In other words, the recessed structure 122a is a structure formed by splicing the sidewalls 122a1, 122a2 of the planes. For example, in the embodiment shown in FIG. 1B, the reflection unit 122 having the sidewall 122a1 and the sidewall 122a2 has an inverted triangle cross-sectional profile. The sidewalls 122a1, 122a2 of the reflection unit 122 can limit the lateral scattering of light and reduce the etendue of the wavelength conversion component 100. In some embodiments, an angle θ between a sidewall (e.g., the sidewall 122a1 or the sidewall 122a2) of at least one of the reflection units 122 and the second direction A2 is greater than 45 degrees. The sidewall 122a1 or the sidewall 122a2 who has the angle θ relative to the second direction A2 greater than 45 degrees will have a better effect of limiting the lateral scattering of light, and can effectively reduce the etendue of the wavelength conversion component 100. If the angle θ between the sidewall 122a1 or the sidewall 122a2 and the second direction A2 is less than 45 degrees, the etendue of the wavelength conversion component 100 will not be significantly affected. In the embodiment shown in FIG. 1B, the angle θ of each of the reflection units 122 is the same. However, in other embodiments, the angle θ of each of the reflection units 122 may be different.

As shown in FIGS. 1A and 1B, after forming the reflection layer 120, the phosphor layer 130 is formed on the reflection layer 120. Specifically, the phosphor layer 130 is filled in the recessed structures 122a of the plurality of reflection units 122. In the embodiment of FIG. 1B, the phosphor layer 130 has a maximum thickness T1. The phosphor layer 130 is uniformly filled in each of the reflection units 122, and the maximum thickness T1 of the phosphor layer 130 is smaller than the maximum height H1 of the top surface 120a of the reflection layer 120, so that the phosphor layer 130 exposes a part of the top surface 120a. The exposed top surface 120a can ensure that the phosphor powder contained in each of the reflection units 122 is separated from each other, which will have the best effect on limiting the lateral scattering of light. In addition, the ratio of the height H of the top surface 120a to the thickness T of the phosphor layer 130 (i.e., the value of dividing the height H by the thickness T) will reciprocally increase and decrease along the first direction A1. For example, when passing through the sidewall 122a1 along the first direction A1, the height H will gradually approach to zero, while the thickness T of the phosphor layer 130 will gradually increase from zero to the maximum thickness T1, so the ratio between the two will gradually decrease. On the other hand, when passing through the sidewall 122a2 along the first direction A1, the height H will gradually increase to the maximum height H1, while the thickness T of the phosphor layer 130 will gradually approach zero, so the ratio between the two will gradually increase. It should be particularly mentioned that since the phosphor layer 130 exposes a part of the top surface 120a of the reflection layer 120, the ratio of the two will vary discontinuously along the first direction A1. For example, when passing through the exposed top surface 120a from the sidewall 122a2 along the first direction A1, the thickness of the phosphor layer 130 is zero, so the ratio will be infinite. The ratio will continue to change along the first direction A1 until leaving the exposed top surface 120a.

Figure 1C:
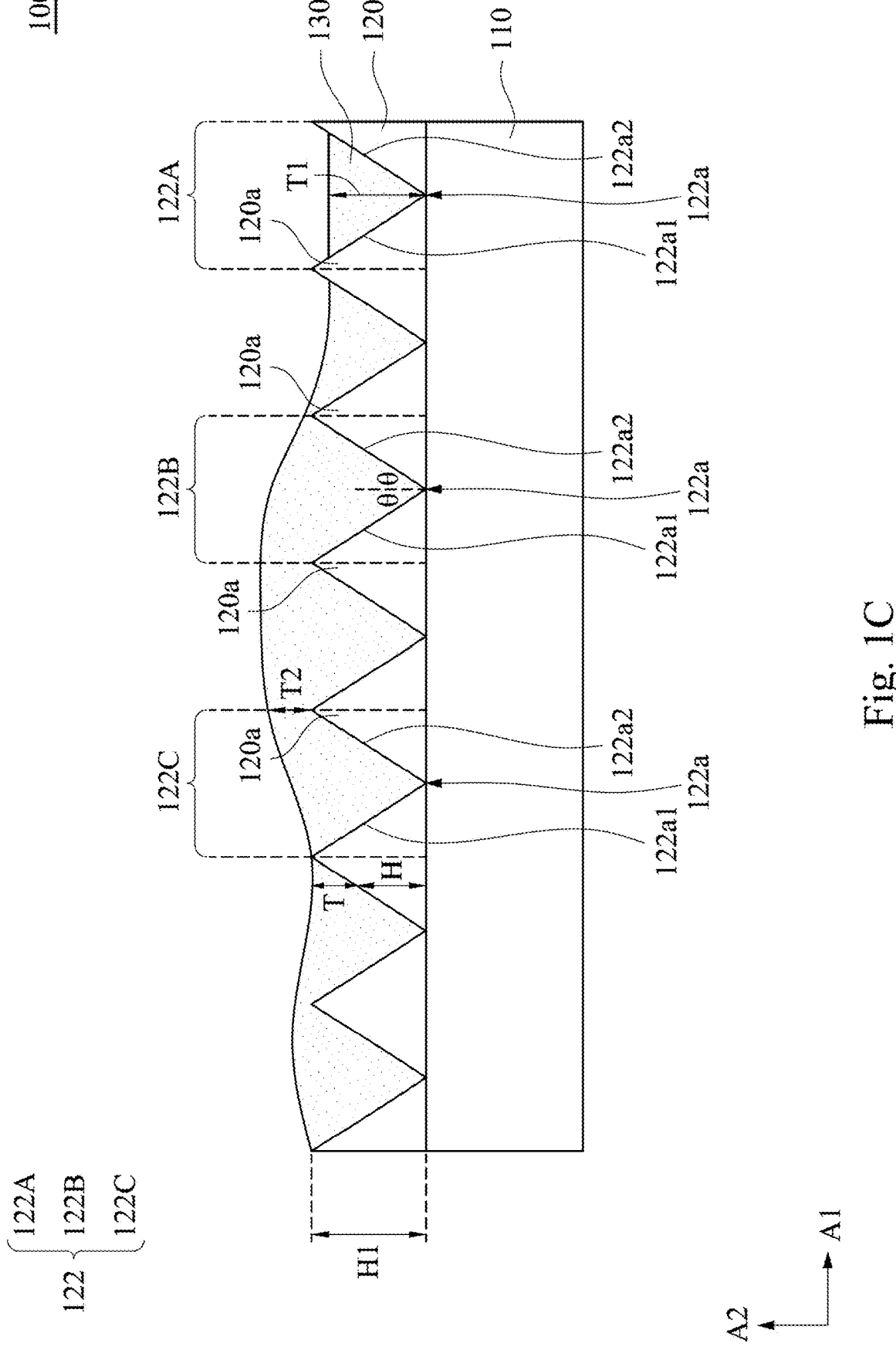
FIG. 1C is a partially enlarged cross-sectional side view of the wavelength conversion component taken along the cross-section indicating line 1B-1B' in FIG. 1A according to another embodiment of the present disclosure.

Reference is made to FIG. 1C. FIG. 1C is a partially enlarged cross-sectional side view of the wavelength conversion component 100 taken along the cross-section indicating line 1B-1B' in FIG. 1A according to another embodiment of the present disclosure. The differences between FIG. 1C and FIG. 1B is that the phosphor layer 130 in FIG. 1C partially covers the top surface 120a (for example, at the reflection units 122B, 122C), and the phosphor layer 130 still has a thickness T2 greater than the maximum height H1 of the top surface 120a. The phosphor layer 130 is unevenly disposed on the reflection layer 120. Specifically, the reflection unit 122A has the phosphor layer 130 with the thickness T1 similar to the reflection unit 122 in FIG. 1B, and the phosphor layer 130 is evenly filled in the recessed structure 122a. On the other hand, the phosphor layer 130 in the reflection units 122B, 122C fills and exceeds the recessed structures 122a, and covers the top surface 120a of the reflection layer 120 with a thickness T2. Therefore, the ratio of the height H1 of the top surface 120a of the reflection units 122B, 122C to the thickness of the phosphor layer 130 varies continuously along the first direction A1. Specifically, when passing through the sidewall 122a2 of the reflection unit 122C along the first direction A1, the thickness of the phosphor layer 130 gradually decreases to the thickness T2, and the ratio will gradually approach a maximum value. Until the thickness of the phosphor layer 130 increases again, the ratio will gradually decrease again.

As shown in FIGS. 1B and 1C, in summary, the continuity of the ratio is determined by whether the phosphor layer 130 covers the top surface 120a of the reflection layer 120 or not. When the phosphor layer 130 exposes the top surface 120a, the ratio will show a discontinuous variation (as shown in FIG. 1B). When the phosphor layer 130 covers the top surface 120a, the ratio will show a continuous variation (as shown in FIG. 1C). In some embodiments, the ratio may vary continuously or discontinuously at different locations of the reflection layer 120. On the other hand, in some embodiments, the maximum thickness T1 of the phosphor layer 130 is in a range from 50 μm to 200 μm. When the maximum thickness T1 of the phosphor layer 130 is greater than 200 μm, the heat dissipation effect of the wavelength conversion component 100 may be affected. On the other hand, when the maximum thickness T1 of the phosphor layer 130 is less than 50 μm, the light intensity of the wavelength conversion component 100 may decrease. In some embodiments, when the maximum thickness T1 of the phosphor layer 130 is 100 μm, the wavelength conversion component 100 will have the best luminous effect.

Figure 1D:
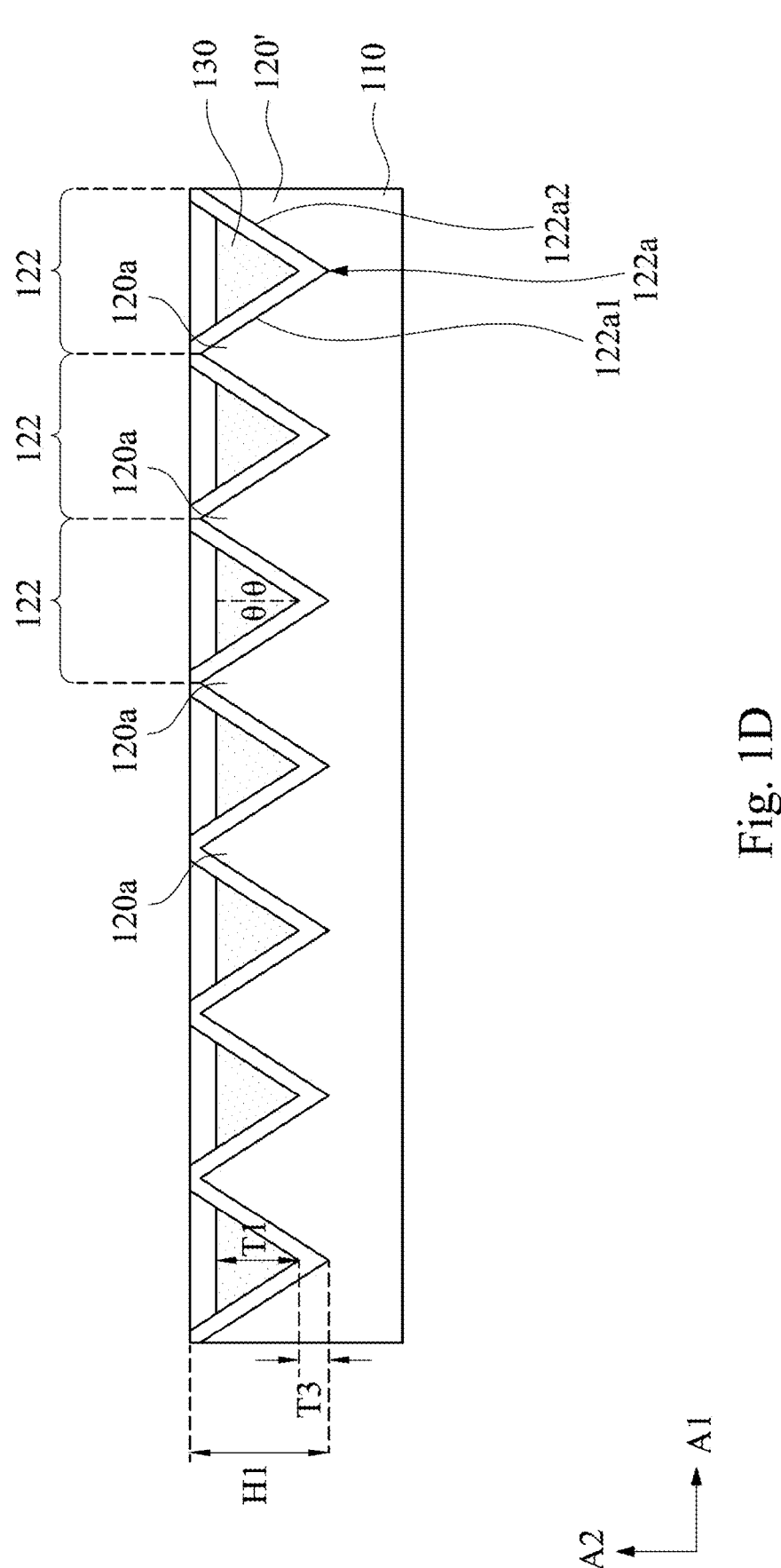
FIG. 1D is a partially enlarged cross-sectional side view of the wavelength conversion component taken along the cross-section indicating line 1B-1B' in FIG. 1A according to another embodiment of the present disclosure.

Reference is made to FIGS. 1A and 1D. FIG. 1D is a partially enlarged cross-sectional side view of the wavelength conversion component 100 taken along the cross-section indicating line 1B-1B' in FIG. 1A according to another embodiment of the present disclosure. Unlike FIG. 1B, in the embodiment of FIG. 1D, the reflection layer 120' has a uniform thickness T3 in the second direction A2 and is conformally formed on the substrate 110. Before forming the reflection layer 120', the substrate 110 may be patterned to form a surface with height differences. For example, in FIG. 1D, the surface of the substrate 110 has a height difference of a height H1. Subsequently, the reflection layer 120' can be conformally formed on the surface of the substrate 110 through coating or other suitable processes, and the reflection layer 120' will also have a height difference of the height H1. The phosphor layer 130 can be disposed on the reflection layer 120' in a manner similar to that described in FIG. 1B or FIG. 1C.

Figure 2A:
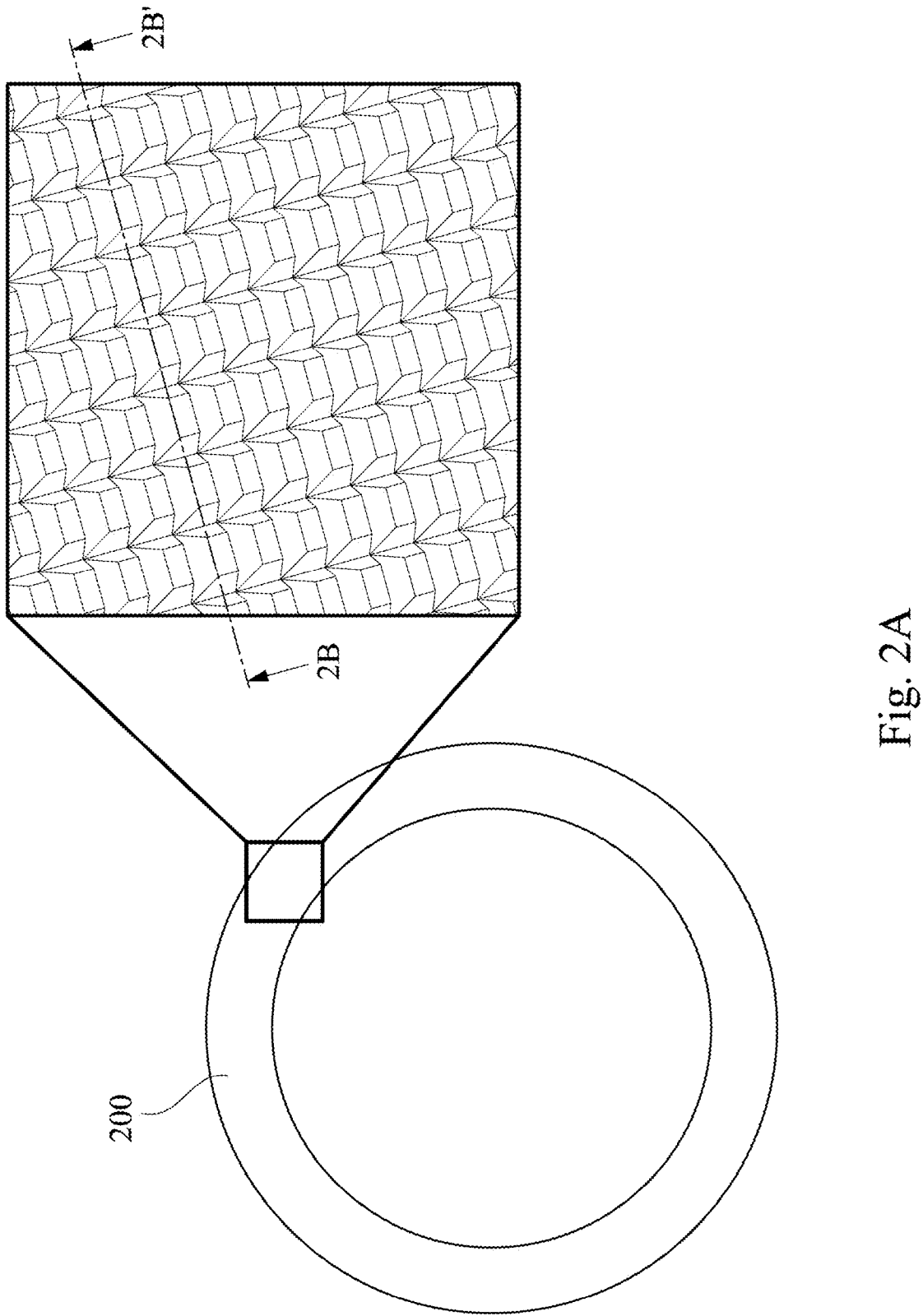
FIG. 2A is a schematic diagram and a partially enlarged view of a wavelength conversion component according to some other embodiments of the present disclosure.
Figure 2B:
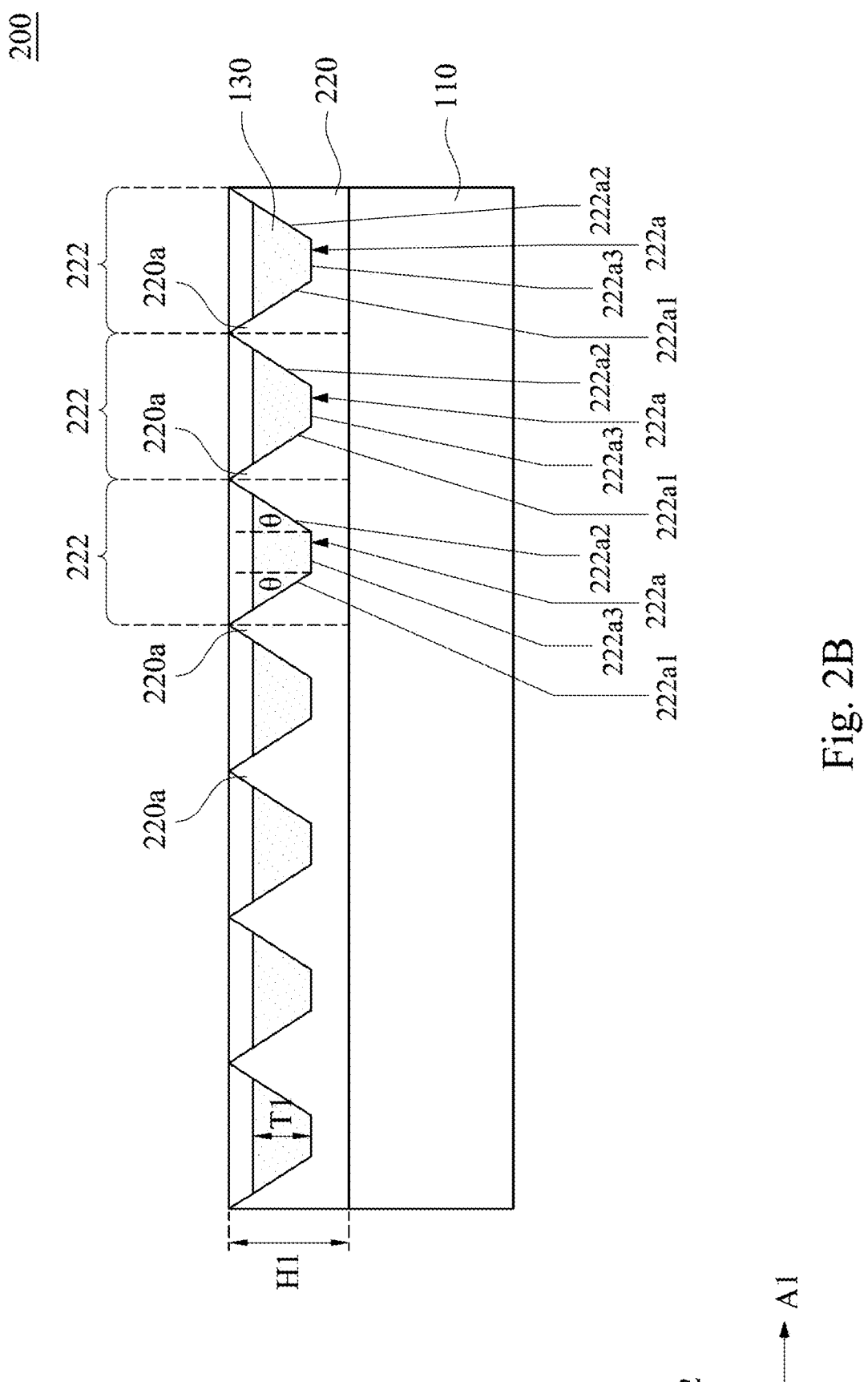
FIG. 2B is a partially enlarged cross-sectional side view of the wavelength conversion component taken along the cross-section indicating line 2B-2B' in FIG. 2A according to an embodiment of the present disclosure.

Reference is made to FIGS. 2A and 2B. FIG. 2A is a schematic diagram and a partially enlarged view of a wavelength conversion component 200 according to some other embodiments of the present disclosure. FIG. 2B is a partially enlarged cross-sectional side view of the wavelength conversion component 200 taken along the cross-section indicating line 2B-2B' in FIG. 2A according to an embodiment of the present disclosure. Different from the wavelength conversion component 100 discussed above in FIGS. 1A to 1D, at least one of the reflection units 222 of the reflection layer 220 of the wavelength conversion component 200 has a bottom surface 222a3. In some embodiments, the bottom surface 222a3 extends parallel to the first direction A1, but the present disclosure is not limited thereto. Specifically, the reflection unit 222 has a recessed structure 222a. The recessed structure 222a is formed by splicing the sidewalls 222a1, 222a2 and the bottom surface 222a3. In the embodiment shown in FIG. 2B, the sidewalls 222a1, 222a2 and the bottom surface 222a3 are all flat, and the recessed structure 222a has a trapezoidal cross-sectional profile. In some embodiments, a length of the bottom surface 222a3 extending along the first direction A1 may be ½ of a length of the reflection unit 222 along the first direction A1, but the present disclosure is not limited thereto.

As shown in FIGS. 2A and 2B, in the embodiment, the top surface 220a of the reflection layer 220 is exposed, and the phosphor layer 130 is evenly filled into the recessed structures 222a of the reflection units 222. However, an arrangement similar to that of the phosphor layer 130 in FIG. 1C can also be used in this embodiment. The sidewalls 222a1, 222a2 have the angle θ relative to the second direction A2. In some embodiments, the angle θ is greater than 45 degrees. The sidewall 222a1 or the sidewall 222a2 who has the angle θ relative to the second direction A2 greater than 45 degrees will have a better effect of limiting the lateral scattering of light, and can effectively reduce the etendue of the wavelength conversion component 100. If the angle θ between the sidewall 222a1 or the sidewall 222a2 and the second direction A2 is less than 45 degrees, the etendue of the wavelength conversion component 200 will not be significantly affected. In the embodiment shown in FIG. 2B, the angles θ of each of the reflection units 222 are the same. However, in other embodiments, the angles θ of each of the reflection units 222 may be different.

Figure 3:
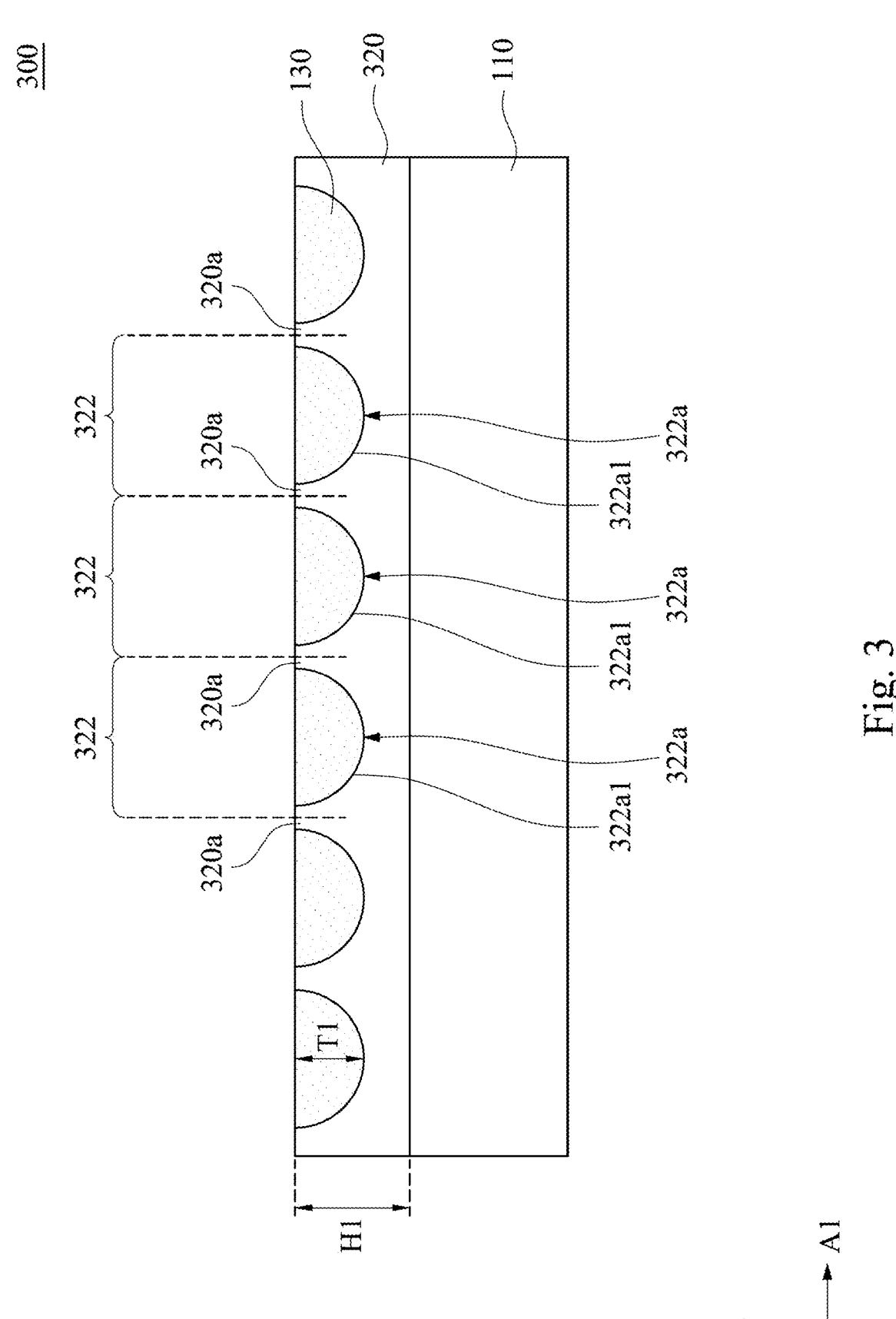
FIG. 3 is a partially enlarged cross-sectional side view of a wavelength conversion component according to another embodiment of the present disclosure.

Reference is made to FIG. 3. FIG. 3 is a partially enlarged cross-sectional side view of a wavelength conversion component 300 according to another embodiment of the present disclosure. In this embodiment, the top surface 320a of the reflection layer 320 is exposed, and the phosphor layer 130 is evenly filled into the recessed structures 322a of the reflection units 322. Different from the foregoing wavelength conversion components 100, 200, at least one of the reflection units 322 in the reflection layer 320 of the wavelength conversion component 300 includes at least one curved surface 322a1. Specifically, the reflection unit 322 has the recessed structure 322a, and the recessed structure 322a is defined by the curved surface 322a1. In some embodiments, the recessed structure 322a may also be formed by splicing a plurality of curved surfaces. In some other embodiments, the recessed structure 322a may also be formed by splicing a plurality of planes or curved surfaces.

Figure 4:
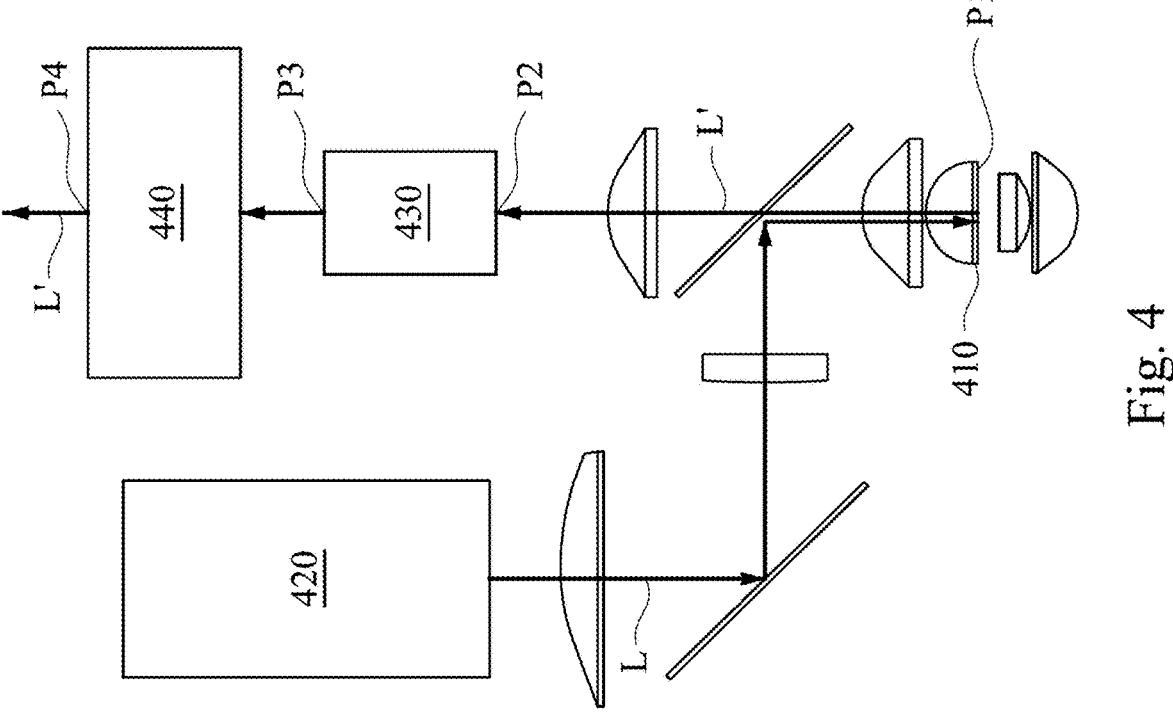
FIG. 4 is a schematic diagram of a light source module according to some embodiments of the present disclosure.
Figure 5:
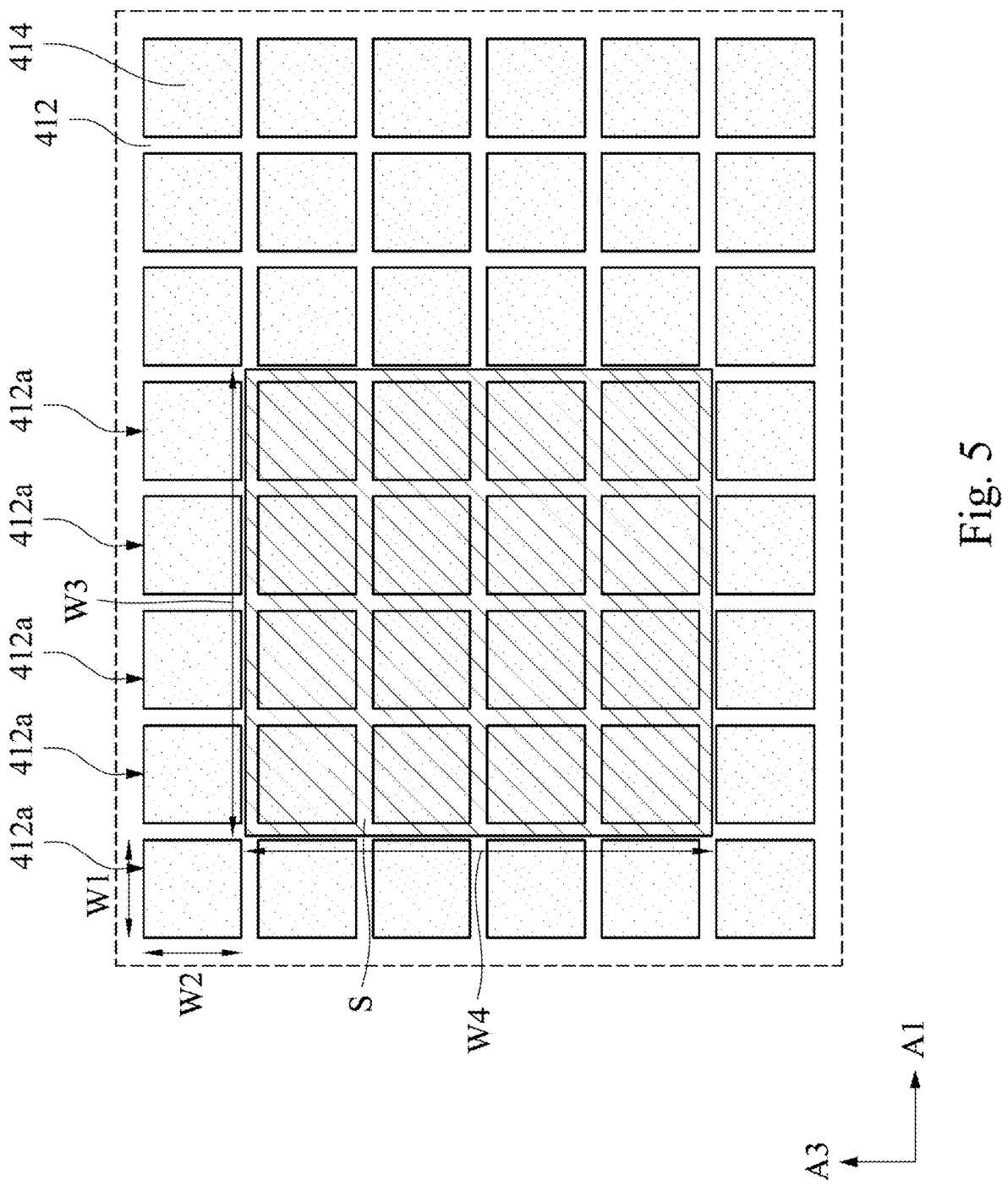
FIG. 5 is a partially enlarged schematic diagram of a light spot on a wavelength conversion component according to some embodiments of the present disclosure.

Reference is made to FIGS. 4 and 5. FIG. 4 is a schematic diagram of a light source module 400 according to some embodiments of the present disclosure. FIG. 5 is a partially enlarged schematic diagram of a light spot S on a wavelength conversion component 410 according to some embodiments of the present disclosure. Some embodiments of the present disclosure relate to the light source module 400 including the aforementioned wavelength conversion component 410 and a light source 420. The light source 420 emits light L to the wavelength conversion component 410 (for example, via at least one lens and/or at least one reflection component). The light L forms the light spot S on the phosphor layer 414. In some embodiments, the light source module 400 is a projector. In some embodiments, the light L includes blue wavelength light. Furthermore, the wavelength conversion component 410 may be replaced by the wavelength conversion components 100, 200, 300 previously discussed in FIGS. 1A to 3.

As shown in FIG. 5, the light L generated by the light source 420 irradiates the wavelength conversion component 410 and forms the light spot S on the phosphor layer 130. The light spot S shown in FIG. 5 is rectangular. However, in other embodiments, the light spot S may have other arbitrary shapes. The reflection layer 412 of the wavelength conversion component 410 further includes a plurality of reflection units 412a. A checkerboard-shaped area among the reflection units 412a is the part of the top surface of the reflection layer 412 exposed by the phosphor layer 414 (such as the top surface 120a in FIG. 1B). In the first direction A1, the reflection unit 412a has a width W1, and the light spot S has a width W3. In a third direction A3, the reflection unit 412a has a width W2, and the light spot S has a width W4.

As shown in FIG. 5, in some embodiments, a ratio of the width W1 of at least one of the reflection units 412a to the width W3 of the light spot S is in a range from 1/2 to 1/20. Specifically, the width W1 of at least one of the reflection units 412a is in a range from 0.4 mm to 1.2 mm, and the width W3 of the light spot S is in a range from 1 mm to 4 mm. In some embodiments, when the width W1 of at least one of the reflection units 412a has a size of 0.8 mm, the wavelength conversion component 410 can have the best conversion efficiency. In some other embodiments, when the width W3 of the light spot S is in a range from 2 mm to 3 mm, the wavelength conversion component 410 can have the best conversion efficiency. When the light spot S is formed on the phosphor layer 414, the number of reflection units 412a arranged in a straight line in the first direction A1 and covered by the light spot S is in a range from 3 to 4 (i.e., viewed in one dimension). In some other embodiments, the number of reflection units 412a covered by the light spot S is in a range from 5 to 20 (i.e., viewed in two dimensions). It should be noted that the reflection units 412a in FIG. 5 all have the same width, but in some other embodiments, the reflection units 412a may have other different widths, shapes and arrangements.

As shown in FIG. 4, in some embodiments, the light source module 400 further includes an integration rod 430 and a digital light processing element 440. After the light source 420 of the light source module 400 emits the light L (excitation light) to the wavelength conversion component 410, the light L will be converted by the wavelength conversion component 410 into light L' (excited light). In some embodiments, the light L' may include wavelengths between red and green. The light L' will pass through the integration rod 430 and enter the digital light processing element 440, and finally be output by the digital light processing element 440. The simulation data results of the software Zemax will be used below to illustrate that the wavelength conversion component 410 indeed reduces the etendue and improves the energy conversion efficiency of the wavelength conversion component 410 and the light source module 400.

Figure 6A:
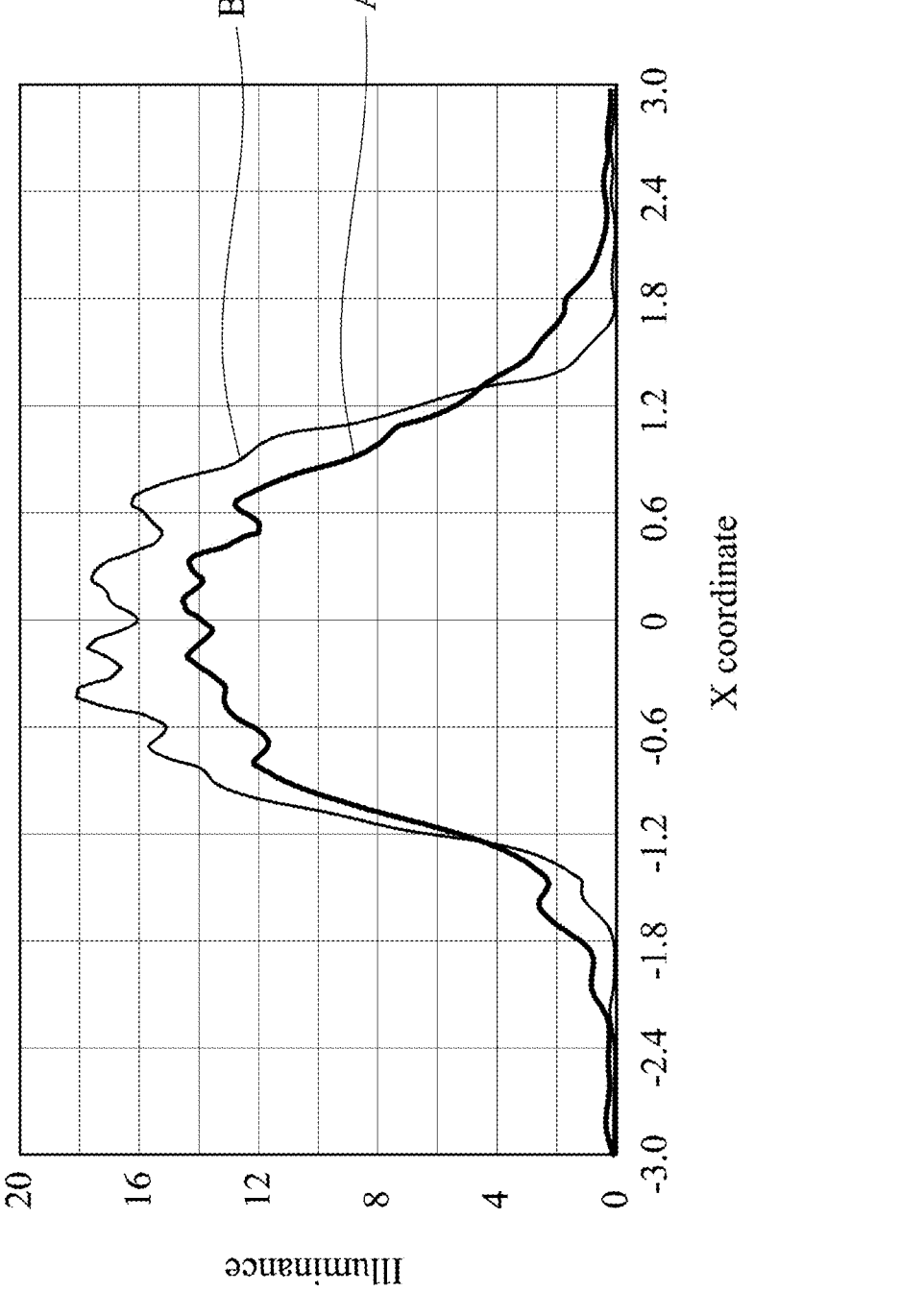
FIG. 6A is a position-illuminance data distribution diagram of light measured in front of the wavelength conversion component in FIG. 4.
Figure 6B:
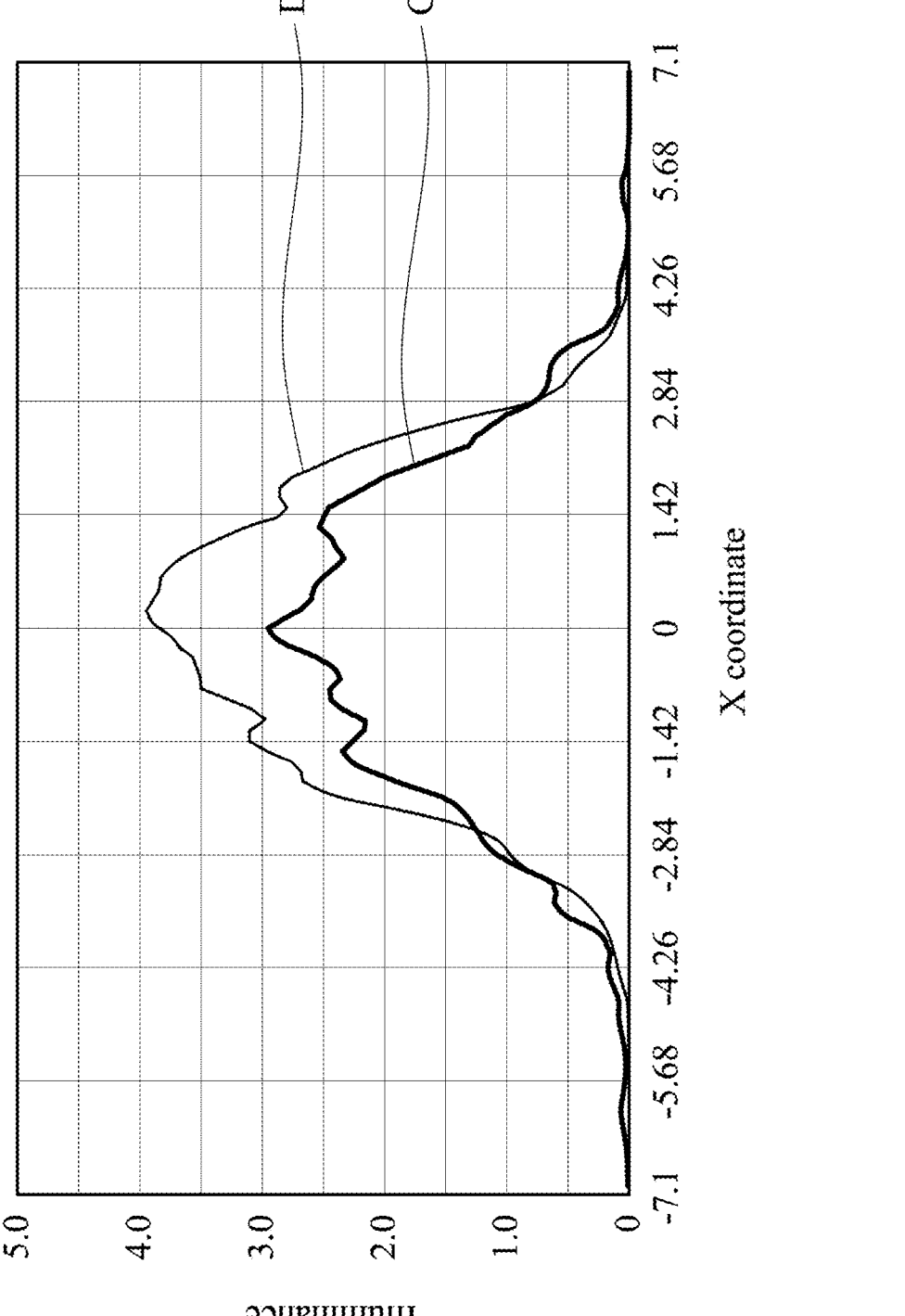
FIG. 6B is a position-illuminance data distribution diagram of light measured in front of an integration rod in FIG. 4.
Figure 6C:
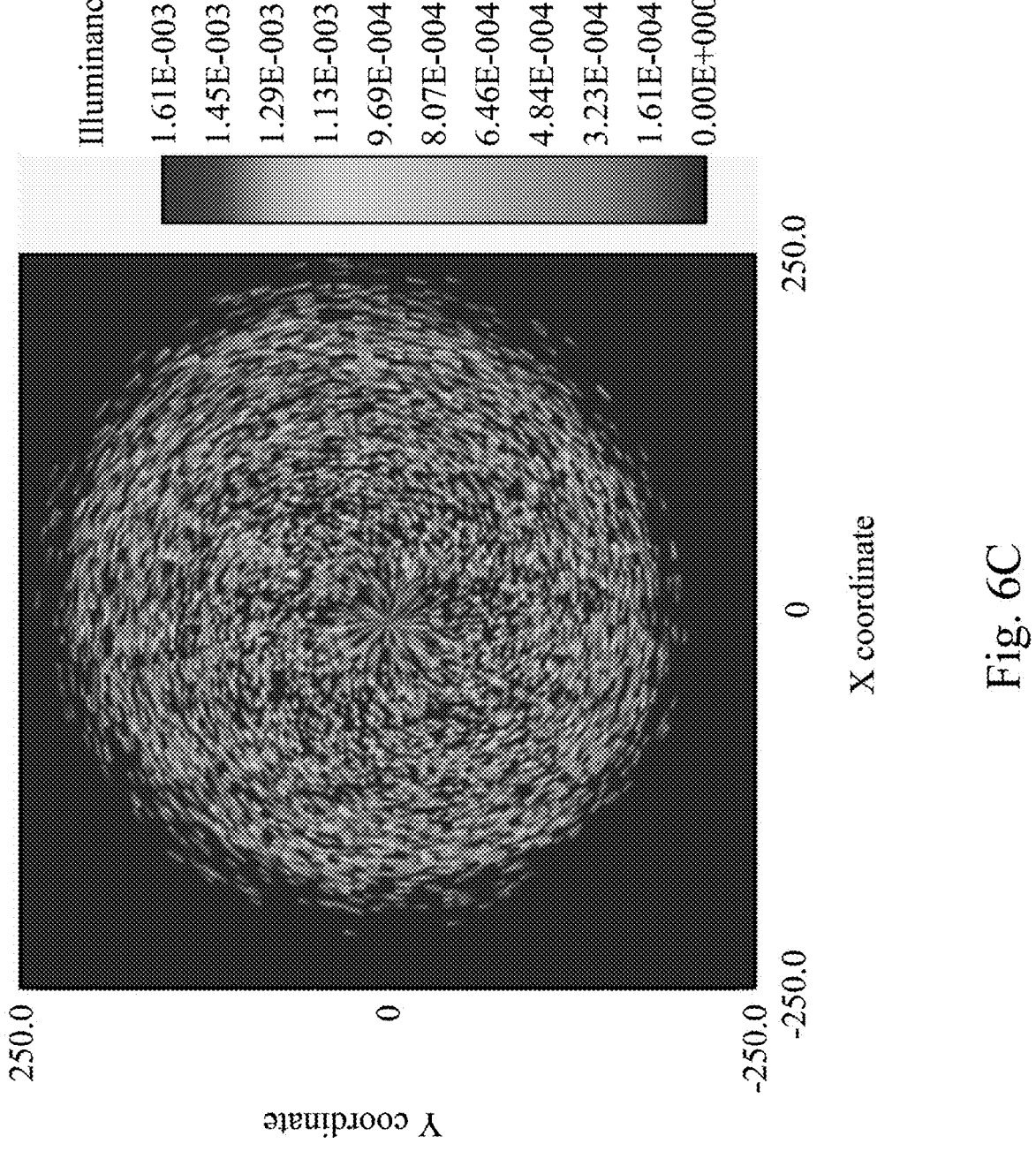
FIG. 6C and FIG. 6D are position-illuminance data distribution diagrams of light measured at an outlet of a digital light processing element in FIG. 4.
Figure 6D:
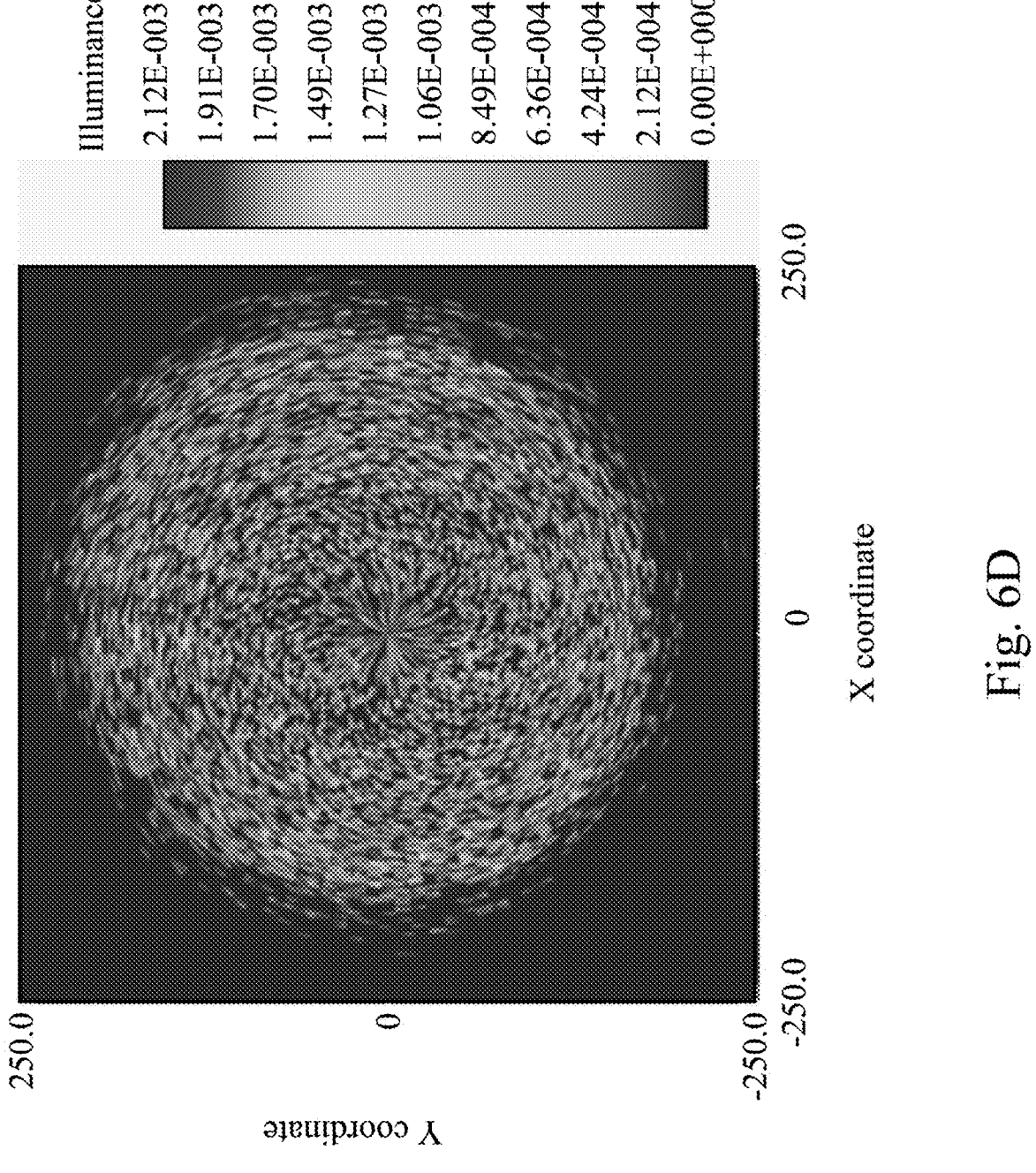

Reference is made to FIG. 4 and FIGS. 6A to 6D. The simulation software measures the position distribution and illuminance of the light L' at different positions of the light source module 400 respectively. FIG. 6A is a position-illuminance data distribution diagram of the light L' measured in front of the wavelength conversion component 410 (position P1) in FIG. 4. FIG. 6B is a position-illuminance data distribution diagram of the light L' measured in front of the integration rod 430 (position P2) in FIG. 4. FIG. 6C and FIG. 6D are position-illuminance data distribution diagrams of the light L' measured at an outlet of the digital light processing element 440 (position P4) in FIG. 4. It should be noted that the results mentioned below are the data obtained by using a conventional wavelength conversion component and the data obtained by the wavelength conversion component 410 described herein respectively.

As shown in FIGS. 4 and 6A, assuming that blue lasers with an energy of 1 W are emitted to the conventional wavelength conversion component and the wavelength conversion component 410 respectively. The light L' generated by the conventional wavelength conversion component measured at the position P1 has 0.651 W (curve A), while the light L' generated by the wavelength conversion component 410 at the position P1 has 0.717 W (curve B). It can be concluded that the energy conversion efficiency of the wavelength conversion component 410 at the position P1 is 10% higher than that of the conventional wavelength conversion component. This gain is the result of the reflection units 412*a* of the wavelength conversion component 410 reflecting the light L' with angles larger than the total reflection angle out of the wavelength conversion component 410 (as shown in FIG. 5). In addition, the light L' generated by the conventional wavelength conversion component and the wavelength conversion component 410 is measured at the position P2 and a position P3 respectively, and the ratio of the energy of the light L' before entering the integration rod 430 to the energy leaving the integration rod 430 can be obtained. According to the software simulation results, the ratio of the conventional wavelength conversion component is 72%, while the ratio of the wavelength conversion component 410 is 76.4%. The increase in the ratio of the wavelength conversion component 410 is due to the fact that the reflection layer 412 of the wavelength conversion component 410 limits the lateral scattering of light. In addition, with reference to FIG. 6B, it can be clearly seen that the light L' (curve D) of the wavelength conversion component 410 is more concentrated than the light L' (curve C) of the conventional wavelength conversion component, which can be used as a proof of limiting the lateral scattering of light. Finally, as shown in FIGS. 4, 6C, and 6D, FIG. 6C shows that the energy of the light L' collected by the conventional wavelength conversion component at the position P4 is 0.3153, and FIG. 6D shows that the energy of the light L' collected by the wavelength conversion component 410 is 0.38968. It can be seen that the energy of the light L' of the wavelength conversion component 410 is increased by 24% compared with the energy of the light L' of the conventional wavelength conversion component. According to the above simulation data, it can be concluded that the energy conversion efficiency of the wavelength conversion component 410 and the light source module 400 is significantly improved.

According to the foregoing recitations of the embodiments of the disclosure, it can be seen that in the wavelength conversion component and the light source module of some embodiments of the present disclosure, disposing the phosphor layer on the reflection layer with a height variation can effectively limit the exit direction of the excited light generated by the phosphor layer. When the exit direction of the excited light is restricted, the lateral scattering of the excited light on the wavelength conversion component will be reduced, and the etendue of the wavelength conversion component will also be reduced accordingly. The excited light generated by the phosphor layer is confined and exits in a direction perpendicular to the wavelength conversion component, which can improve the energy conversion efficiency of the wavelength conversion component. The light source module with the aforementioned wavelength conversion component will be able to improve its light utilization efficiency.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wavelength conversion component, comprising:
a substrate;
a reflection layer disposed on the substrate and extending along a first direction, the reflection layer having a top surface away from the substrate, the top surface having a height variation in a second direction perpendicular to the first direction along the first direction; and
a phosphor layer disposed on the reflection layer, the phosphor layer having a thickness variation in the second direction along the first direction,
wherein a ratio of a height of the top surface and a thickness of the phosphor layer increases and decreases reciprocally along the first direction,
wherein the reflection layer further comprises a plurality of reflection units each having a recessed structure, at least one of the reflection units is formed by a plurality of planes that are spliced, and an angle between a sidewall of at least one of the reflection units and the second direction is greater than 45 degrees.

2. The wavelength conversion component of claim 1, wherein the reflection layer has a uniform thickness and is conformally formed on the substrate.

3. The wavelength conversion component of claim 1, wherein the reflection layer has a thickness variation in the second direction along the first direction.

4. The wavelength conversion component of claim 1, wherein the ratio varies continuously along the first direction.

5. The wavelength conversion component of claim 1, wherein the ratio varies discontinuously along the first direction.

6. The wavelength conversion component of claim 5, wherein the phosphor layer exposes at least a part of the top surface of the reflection layer.

7. The wavelength conversion component of claim 1, wherein a maximum thickness of the phosphor layer is in a range from 50 μm to 200 μm.

8. The wavelength conversion component of claim 1, wherein at least one of the reflection units has a bottom surface extending along the first direction.

9. The wavelength conversion component of claim 1, wherein at least one of the reflection units includes at least one curved surface.

10. A light source module, comprising:

a wavelength conversion component comprising:

a substrate;

a reflection layer disposed on the substrate and extending along a first direction, the reflection layer having a top surface away from the substrate, the top surface having a height variation in a second direction perpendicular to the first direction along the first direction; and a phosphor layer disposed on the reflection layer, the phosphor layer having a thickness variation in the second direction along the first direction, wherein a ratio of a height of the top surface and a thickness of the phosphor layer increases and decreases reciprocally along the first direction; and a light source configured to emit light to the wavelength conversion component, the light forming a light spot on the phosphor layer, wherein the reflection layer of the wavelength conversion component further comprises a plurality of reflection units, and a ratio of a width of at least one of the reflection units to a width of the light spot is in a range from 1/2 to 1/20.

11. The light source module of claim 10, wherein at least one of the reflection units has a width in a range from 0.4 mm to 1.2 mm.

12. The light source module of claim 10, wherein a width of the light spot is in a range from 1 mm to 4 mm.

13. The light source module of claim 10, wherein in the first direction, a number of the reflection units covered by the light spot is in a range from 3 to 4.

14. The light source module of claim 10, wherein a number of reflection units covered by the light spot is in a range from 5 to 20.

\* \* \* \* \*